(12) United States Patent
Davidovitch et al.

(10) Patent No.: US 7,634,435 B2
(45) Date of Patent: Dec. 15, 2009

(54) DIVERSIFIED FIXED INCOME PRODUCT AND METHOD FOR CREATING AND MARKETING SAME

(75) Inventors: Jeffrey Davidovitch, Brooklyn, NY (US); Chad S. Parson, Mount Vernon, NY (US); Kevin E. Sprouse, St. Louis, MO (US)

(73) Assignee: JP Morgan Chase Bank, New York, NY (US)

( * ) Notice: Subject to any disclaimer, the term of this patent is extended or adjusted under 35 U.S.C. 154(b) by 1156 days.

(21) Appl. No.: 10/638,019

(22) Filed: Aug. 8, 2003

(65) Prior Publication Data

US 2004/0230507 A1 Nov. 18, 2004

Related U.S. Application Data

(60) Provisional application No. 60/470,179, filed on May 13, 2003.

(51) Int. Cl.
*G06Q 40/00* (2006.01)

(52) U.S. Cl. .......................... 705/35; 705/36 R; 705/37

(58) Field of Classification Search .................. 705/35, 705/36 R, 37
See application file for complete search history.

(56) References Cited

U.S. PATENT DOCUMENTS

| | | | |
|---|---|---|---|
| 4,169,285 A | 9/1979 | Walker | |
| 4,648,038 A | 3/1987 | Roberts et al. | |
| 4,739,478 A | 4/1988 | Roberts et al. | |
| 4,742,457 A | 5/1988 | Leon et al. | |
| 4,752,877 A | 6/1988 | Roberts et al. | |
| 4,933,842 A | 6/1990 | Durbinet et al. | |
| 5,121,469 A | 6/1992 | Richards et al. | |
| 5,222,019 A | 6/1993 | Yoshino et al. | |
| 5,257,369 A | 10/1993 | Skeen et al. | |
| 5,270,922 A | 12/1993 | Higgins | |
| 5,297,031 A | 3/1994 | Gutterman et al. | |
| 5,297,032 A | 3/1994 | Trojan et al. | |

(Continued)

FOREIGN PATENT DOCUMENTS

WO 98/43170 10/1998

(Continued)

OTHER PUBLICATIONS

Silverman; A New Strategy for Giving Away Your Money, Wall Street Journal, D1, Oct. 6, 2004.

(Continued)

*Primary Examiner*—Ella Colbert
*Assistant Examiner*—Samica L Norman
(74) *Attorney, Agent, or Firm*—Lowenstein Sandler PC

(57) ABSTRACT

A method of creating, registering and marketing to the public fixed income beneficial interests entitling the owners to fractional ownership of a pool of assets that pay income. The method involves selecting and acquiring from the secondary market the pool of assets, forming a trust to hold the pool of assets, creating beneficial interests in the trust, smoothing the flow of income from the assets, registering the beneficial interests for sale to the public pursuant the Securities Act of 1983, and marketing the interests. The assets can be selected to provide substantially constant payments and to return substantially par value at maturity. An automated system useful in implementing the method is described.

31 Claims, 3 Drawing Sheets

U.S. PATENT DOCUMENTS

| | | |
|---|---|---|
| 5,305,200 A | 4/1994 | Hartheimer et al. |
| 5,419,890 A | 5/1995 | Saidi |
| 5,454,104 A | 9/1995 | Steidlmayer et al. |
| 5,462,438 A | 10/1995 | Becker et al. |
| 5,497,317 A | 3/1996 | Hawkins et al. |
| 5,517,406 A | 5/1996 | Harris et al. |
| 5,557,798 A | 9/1996 | Skeen et al. |
| 5,563,783 A | 10/1996 | Stolfo et al. |
| 5,592,379 A | 1/1997 | Finfrock et al. |
| 5,649,186 A | 7/1997 | Ferguson |
| 5,675,746 A | 10/1997 | Marshall |
| 5,689,650 A | 11/1997 | McClelland et al. |
| 5,706,502 A | 1/1998 | Foley et al. |
| 5,710,889 A | 1/1998 | Clark et al. |
| 5,724,593 A | 3/1998 | Hargrave, III et al. |
| 5,742,775 A | 4/1998 | King |
| 5,778,157 A | 7/1998 | Oatman et al. |
| 5,787,402 A | 7/1998 | Potter et al. |
| 5,806,047 A | 9/1998 | Hackel et al. |
| 5,806,048 A | 9/1998 | Kiron et al. |
| 5,819,273 A | 10/1998 | Vora et al. |
| 5,832,461 A | 11/1998 | Leon et al. |
| 5,845,266 A | 12/1998 | Lupien et al. |
| 5,864,827 A | 1/1999 | Wilson |
| 5,878,404 A | 3/1999 | Stout et al. |
| 5,880,725 A | 3/1999 | Southgate |
| 5,890,140 A | 3/1999 | Clark et al. |
| 5,913,214 A | 6/1999 | Madnick et al. |
| 5,918,218 A | 6/1999 | Harris et al. |
| 5,922,044 A | 7/1999 | Banthia |
| 5,926,792 A | 7/1999 | Koppes et al. |
| 5,940,810 A | 8/1999 | Traub et al. |
| 5,944,784 A | 8/1999 | Simonoff et al. |
| 5,946,667 A * | 8/1999 | Tull et al. ................ 705/36 R |
| 5,950,176 A | 9/1999 | Keiser et al. |
| 5,966,531 A | 10/1999 | Skeen et al. |
| 5,966,672 A | 10/1999 | Knupp |
| 5,970,479 A | 10/1999 | Shepherd |
| 5,986,673 A | 11/1999 | Martz |
| 5,995,943 A | 11/1999 | Bull et al. |
| 6,006,206 A | 12/1999 | Smith et al. |
| 6,012,046 A | 1/2000 | Lupien et al. |
| 6,018,714 A | 1/2000 | Risen, Jr. |
| 6,018,721 A | 1/2000 | Aziz et al. |
| 6,023,280 A | 2/2000 | Becker et al. |
| 6,029,146 A | 2/2000 | Hawkins et al. |
| 6,029,147 A | 2/2000 | Horadan et al. |
| 6,035,287 A | 3/2000 | Stallaert et al. |
| 6,049,783 A | 4/2000 | Segal et al. |
| 6,052,673 A | 4/2000 | Leon et al. |
| 6,055,522 A | 4/2000 | Krishna et al. |
| 6,058,378 A | 5/2000 | Clark et al. |
| 6,061,662 A | 5/2000 | Makivic |
| 6,064,984 A | 5/2000 | Ferguson et al. |
| 6,070,151 A | 5/2000 | Frankel |
| 6,073,104 A | 6/2000 | Field |
| 6,073,115 A | 6/2000 | Marshall |
| 6,078,914 A | 6/2000 | Redfern |
| 6,078,956 A | 6/2000 | Bryant et al. |
| 6,081,774 A | 6/2000 | de Hita et al. |
| 6,088,685 A | 7/2000 | Kiron et al. |
| 6,092,056 A | 7/2000 | Tull, Jr. et al. |
| 6,105,005 A | 8/2000 | Fuhrer |
| 6,131,082 A | 10/2000 | Hargrave, III et al. |
| 6,134,600 A | 10/2000 | Liu |
| 6,148,298 A | 11/2000 | LaStrange et al. |
| 6,173,270 B1 | 1/2001 | Cristofich et al. |
| 6,173,276 B1 | 1/2001 | Kant et al. |
| 6,178,420 B1 | 1/2001 | Sassano |
| 6,185,567 B1 | 2/2001 | Ratnaraj et al. |
| 6,195,647 B1 | 2/2001 | Martyn et al. |
| 6,226,623 B1 | 5/2001 | Schein et al. |
| 6,233,566 B1 | 5/2001 | Levine et al. |
| 6,236,972 B1 | 5/2001 | Shkedy |
| 6,236,977 B1 | 5/2001 | Verba et al. |
| 6,243,670 B1 | 6/2001 | Bessho et al. |
| 6,260,021 B1 | 7/2001 | Wong et al. |
| 6,263,321 B1 | 7/2001 | Daughtery, III |
| 6,263,335 B1 | 7/2001 | Paik et al. |
| 6,266,683 B1 | 7/2001 | Yehuda et al. |
| 6,272,474 B1 | 8/2001 | Garcia |
| 6,275,229 B1 | 8/2001 | Weiner et al. |
| 6,278,982 B1 | 8/2001 | Korhammer et al. |
| 6,282,537 B1 | 8/2001 | Madnick et al. |
| 6,285,986 B1 | 9/2001 | Andrews |
| 6,285,989 B1 | 9/2001 | Shoham |
| 6,304,858 B1 | 10/2001 | Mosler et al. |
| 6,313,854 B1 | 11/2001 | Gibson |
| 6,317,726 B1 | 11/2001 | O'Shaughnessy |
| 6,317,728 B1 | 11/2001 | Kane |
| 6,321,212 B1 | 11/2001 | Lange |
| 6,323,881 B1 | 11/2001 | Broulik et al. |
| 6,332,163 B1 | 12/2001 | Bowman-Amuah |
| 6,338,055 B1 | 1/2002 | Hagmann et al. |
| 6,338,068 B1 | 1/2002 | Moore et al. |
| 6,343,287 B1 | 1/2002 | Kumar et al. |
| 6,347,307 B1 | 2/2002 | Sandhu et al. |
| 6,349,291 B1 | 2/2002 | Varma |
| 6,356,933 B2 | 3/2002 | Mitchell et al. |
| 6,360,210 B1 | 3/2002 | Wallman |
| 6,366,908 B1 | 4/2002 | Chong et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,401,080 B1 | 6/2002 | Bigus et al. |
| 6,408,282 B1 | 6/2002 | Buist |
| 6,418,417 B1 | 7/2002 | Corby et al. |
| 6,421,653 B1 | 7/2002 | May |
| 6,424,980 B1 | 7/2002 | Iizuka et al. |
| 6,429,868 B1 | 8/2002 | Dehner, Jr. et al. |
| 6,442,545 B1 | 8/2002 | Feldman et al. |
| 6,446,110 B1 | 9/2002 | Lection et al. |
| 6,457,066 B1 | 9/2002 | Mein et al. |
| 6,460,021 B1 | 10/2002 | Kirksey |
| 6,480,882 B1 | 11/2002 | McAdam et al. |
| 6,489,954 B1 | 12/2002 | Powlette |
| 6,490,584 B2 | 12/2002 | Barrett et al. |
| 6,493,681 B1 | 12/2002 | Tertitski et al. |
| 6,510,406 B1 | 1/2003 | Marchisio |
| 6,516,303 B1 | 2/2003 | Wallman |
| 6,516,308 B1 | 2/2003 | Cohen |
| 6,523,022 B1 | 2/2003 | Hobbs |
| 6,556,987 B1 | 4/2003 | Brown et al. |
| 6,564,250 B1 | 5/2003 | Nguyen |
| 6,581,056 B1 | 6/2003 | Rao |
| 6,581,062 B1 | 6/2003 | Draper et al. |
| 6,598,028 B1 | 7/2003 | Sullivan et al. |
| 6,601,044 B1 | 7/2003 | Wallman |
| 6,611,825 B1 | 8/2003 | Billheimer et al. |
| 6,615,187 B1 | 9/2003 | Ashenmil et al. |
| 6,629,097 B1 | 9/2003 | Keith |
| 6,631,373 B1 | 10/2003 | Otani et al. |
| 6,633,868 B1 | 10/2003 | Min et al. |
| 7,212,993 B1 * | 5/2007 | Bodurtha et al. .............. 705/35 |
| 7,222,094 B2 | 5/2007 | Ross |
| 7,233,921 B2 | 6/2007 | Takeda et al. |
| 7,249,037 B2 | 7/2007 | Koppes et al. |
| 7,249,075 B1 * | 7/2007 | Altomare et al. ............. 705/35 |
| 7,249,077 B2 | 7/2007 | Williams et al. |
| 7,249,095 B2 | 7/2007 | Davies et al. |
| 7,272,580 B2 | 9/2007 | Brady et al. |
| 2001/0011241 A1 | 8/2001 | Nemzow |

| | | | | | | |
|---|---|---|---|---|---|---|
| 2001/0011242 A1 | 8/2001 | Allex et al. | | 2003/0018714 A1 | 1/2003 | Mikhailov et al. |
| 2001/0018674 A1 | 8/2001 | Schein et al. | | 2003/0028456 A1* | 2/2003 | Yolles ........................ 705/35 |
| 2001/0025264 A1 | 9/2001 | Deaddio et al. | | 2003/0033212 A1 | 2/2003 | Sandhu et al. |
| 2001/0032217 A1 | 10/2001 | Huang | | 2003/0037174 A1 | 2/2003 | Lavin et al. |
| 2001/0042034 A1 | 11/2001 | Elliott | | 2003/0065594 A1 | 4/2003 | Murphy |
| 2001/0043235 A1 | 11/2001 | Best et al. | | 2003/0066025 A1 | 4/2003 | Garner et al. |
| 2001/0044771 A1 | 11/2001 | Usher et al. | | 2003/0066032 A1 | 4/2003 | Ramachandran et al. |
| 2001/0056397 A1 | 12/2001 | Kelly et al. | | 2003/0078869 A1 | 4/2003 | Williams |
| 2001/0056398 A1 | 12/2001 | Scheirer | | 2003/0083975 A1 | 5/2003 | O'Grady et al. |
| 2002/0002530 A1 | 1/2002 | May | | 2003/0088496 A1 | 5/2003 | Piotrowski |
| 2002/0004777 A1 | 1/2002 | Foster et al. | | 2003/0093360 A1 | 5/2003 | May |
| 2002/0007335 A1 | 1/2002 | Millard et al. | | 2003/0093362 A1 | 5/2003 | Tupper et al. |
| 2002/0007358 A1 | 1/2002 | Johnson et al. | | 2003/0093565 A1 | 5/2003 | Berger et al. |
| 2002/0013753 A1 | 1/2002 | Marks de Chabris et al. | | 2003/0105981 A1 | 6/2003 | Miller et al. |
| 2002/0013862 A1 | 1/2002 | Orchard et al. | | 2003/0115122 A1 | 6/2003 | Slater et al. |
| 2002/0016762 A1 | 2/2002 | Feilbogen et al. | | 2003/0126063 A1 | 7/2003 | Reuter |
| 2002/0016819 A1 | 2/2002 | Sugimoto et al. | | 2003/0126068 A1 | 7/2003 | Hauk et al. |
| 2002/0018077 A1 | 2/2002 | Powlette | | 2003/0126069 A1 | 7/2003 | Cha |
| 2002/0019805 A1 | 2/2002 | Kalotay | | 2003/0126117 A1 | 7/2003 | Megiddo et al. |
| 2002/0022956 A1 | 2/2002 | Ukranincsky et al. | | 2003/0140035 A1 | 7/2003 | Burrows |
| 2002/0023053 A1 | 2/2002 | Szoc et al. | | 2003/0149653 A1 | 8/2003 | Penney |
| 2002/0026405 A1 | 2/2002 | Haar | | 2003/0154071 A1 | 8/2003 | Shreve |
| 2002/0026449 A1 | 2/2002 | Azencott | | 2003/0154158 A1 | 8/2003 | Martyn et al. |
| 2002/0026462 A1 | 2/2002 | Shotton, Jr. et al. | | 2003/0158949 A1 | 8/2003 | Miller et al. |
| 2002/0029183 A1 | 3/2002 | Vlahoplus et al. | | 2003/0188255 A1 | 10/2003 | Shimizu et al. |
| 2002/0032644 A1 | 3/2002 | Corby et al. | | 2003/0220861 A1 | 11/2003 | Broms et al. |
| 2002/0035561 A1 | 3/2002 | Archer et al. | | 2003/0220868 A1 | 11/2003 | May |
| 2002/0042767 A1 | 4/2002 | Kwan | | 2003/0233459 A1 | 12/2003 | Miller et al. |
| 2002/0046154 A1* | 4/2002 | Pritchard ..................... 705/37 | | 2003/0236862 A1 | 12/2003 | Miller et al. |
| 2002/0046158 A1 | 4/2002 | Kelly et al. | | 2003/0236957 A1 | 12/2003 | Miller et al. |
| 2002/0049666 A1 | 4/2002 | Reuter et al. | | 2004/0039692 A1 | 2/2004 | Shields et al. |
| 2002/0054115 A1 | 5/2002 | Mack et al. | | 2004/0064397 A1 | 4/2004 | Lynn et al. |
| 2002/0059129 A1 | 5/2002 | Kemp et al. | | 2004/0068559 A1 | 4/2004 | Shaw |
| 2002/0059141 A1 | 5/2002 | Davies et al. | | 2004/0078248 A1 | 4/2004 | Altschuler |
| 2002/0065752 A1 | 5/2002 | Lewis | | 2004/0103003 A1 | 5/2004 | Mayers et al. |
| 2002/0065755 A1 | 5/2002 | Shlafman et al. | | 2004/0128169 A1 | 7/2004 | Lusen |
| 2002/0069157 A1 | 6/2002 | Jordan | | 2004/0148247 A1 | 7/2004 | Miller et al. |
| 2002/0073007 A1 | 6/2002 | Ayache | | 2004/0148259 A1 | 7/2004 | Reiners et al. |
| 2002/0078253 A1 | 6/2002 | Szondy et al. | | 2004/0162775 A1 | 8/2004 | Winklevoss et al. |
| 2002/0087373 A1 | 7/2002 | Dickstein et al. | | 2004/0167850 A1 | 8/2004 | Dreyer et al. |
| 2002/0087391 A1 | 7/2002 | Williams | | 2004/0193536 A1 | 9/2004 | Marlowe-Noren |
| 2002/0087454 A1 | 7/2002 | Calo et al. | | 2004/0220885 A1 | 11/2004 | Salzmann et al. |
| 2002/0087455 A1 | 7/2002 | Tsagarakis et al. | | 2004/0225536 A1 | 11/2004 | Schoen et al. |
| 2002/0087457 A1 | 7/2002 | Madeley et al. | | 2004/0225596 A1 | 11/2004 | Kemper et al. |
| 2002/0099646 A1 | 7/2002 | Agarwal et al. | | 2005/0010517 A1 | 1/2005 | Lowenstein et al. |
| 2002/0099656 A1 | 7/2002 | Poh Wong | | 2005/0027646 A1 | 2/2005 | Hall et al. |
| 2002/0101120 A1 | 8/2002 | Akama et al. | | 2005/0060256 A1 | 3/2005 | Peterson et al. |
| 2002/0107774 A1 | 8/2002 | Henninger et al. | | 2005/0071265 A1 | 3/2005 | Nishimaki |
| 2002/0112056 A1 | 8/2002 | Baldwin et al. | | 2005/0086170 A1 | 4/2005 | Rao |
| 2002/0123947 A1 | 9/2002 | Yuste et al. | | 2005/0108118 A1 | 5/2005 | Malackowski et al. |
| 2002/0130868 A1 | 9/2002 | Smith | | 2005/0216387 A1* | 9/2005 | Barany et al. .................. 705/35 |
| 2002/0138390 A1 | 9/2002 | May | | 2006/0229973 A1 | 10/2006 | Sternberg |
| 2002/0143673 A1 | 10/2002 | Hitchings et al. | | 2006/0259419 A1 | 11/2006 | Monsen et al. |
| 2002/0147671 A1 | 10/2002 | Sloan et al. | | 2007/0005478 A1 | 1/2007 | Lambe |
| 2002/0152154 A1 | 10/2002 | Rothman et al. | | | | |
| 2002/0152156 A1 | 10/2002 | Tyson-Quah | | | | |
| 2002/0156658 A1 | 10/2002 | Selesny et al. | | | FOREIGN PATENT DOCUMENTS | |
| 2002/0156719 A1 | 10/2002 | Finebaum et al. | | | | |
| 2002/0161692 A1 | 10/2002 | Loh et al. | | WO | 01/20530 | 3/2001 |
| 2002/0161853 A1 | 10/2002 | Burak et al. | | WO | 01/37540 | 5/2001 |
| 2002/0169707 A1 | 11/2002 | Koek et al. | | WO | 01/57716 | 8/2001 |
| 2002/0174043 A1 | 11/2002 | Gilbert et al. | | WO | 01/59670 | 8/2001 |
| 2002/0178096 A1 | 11/2002 | Marshall | | WO | 02/03774 | 1/2002 |
| 2002/0184132 A1 | 12/2002 | Foster | | WO | 02/14991 | 2/2002 |
| 2002/0184237 A1 | 12/2002 | McFeely | | WO | 02/054189 | 7/2002 |
| 2002/0194097 A1 | 12/2002 | Reitz | | WO | 02/056146 | 7/2002 |
| 2002/0194114 A1 | 12/2002 | Erdmier | | WO | 02/063516 | 8/2002 |
| 2002/0198808 A1 | 12/2002 | Myers | | WO | 02/065278 | 8/2002 |
| 2002/0198833 A1 | 12/2002 | Wohlstadter | | WO | 02/065286 | 8/2002 |
| 2003/0004942 A1 | 1/2003 | Bird | | WO | 03/012588 | 2/2003 |
| 2003/0009406 A1 | 1/2003 | Ross | | WO | 03/030013 | 4/2003 |
| 2003/0009411 A1 | 1/2003 | Ram et al. | | WO | 03/032158 | 4/2003 |
| 2003/0018558 A1 | 1/2003 | Heffner et al. | | WO | 03/065256 | 8/2003 |

WO 03/102733 12/2003

OTHER PUBLICATIONS

Unknown; Investigating Systems; www.Investing-Systems.com/Software.html; Printed Oct. 21, 2002.
Ericson; Softwerc Releases Patent Pending; www.Portalsmag.com/Articles/Default.asp?ArticleID=4191; Nov. 15, 2002.
IBM Corp.; Strict Read Order Control for a Queing system; Published Mar. 2002.
Novell, Inc.; of Viewing Information and Viewing Basic Information About a Print Job; Publication Date Jun. 1, 1993.
Hewlett-Packard; X4Queview.org; Publication Date Mar. 1992.
Electronic Trading Tools; www.GHCO.com/Customer_Service/Trading_Platforms.asp.
Fast Email Extractor 4.4; www.Lencom.com/Fee.html; Last Upgrade Sep. 2, 2003.
Intellseek and Inxight Partner to Provide New Business Intelligence Solutions, www.Inxight.com/News/021029_Intelliseek.html, Oct. 29, 2002.
Myllymaki; With Standard XML Technologies; Abstract; May 2, 2001.
Ribiero-Neto et al.; Top Down Extraction of Semi-Structured Data, String Processing and Information Retrieval Symposium & AMP; International Workshop on Groupware; Sep. 21, 1999; Cancun Mexico.
Rupali et al.; Phrase-Based Text Representation for Managing the Web Documents; p. 165; International Conference on Information Technology; Computers and Communications; Apr. 28, 2003; Las Vegas, Nevada.
May; Modeling and Querying Structure and Contents of the Web, 10th International Workshop on Database & AMP; Expert Systems Applications, Sep. 1, 1999, p. 721.
Manco et al.; A Framework for Adaptive Mail Classification, 14th IEEE Conference on Tools With Artificial Intelligence (ICTAI'02), Nov. 4, 2002, p. 387.
Carchiolo et al.; Structuring the Web; p. 1123; 11th International Workshop on Dtabase and Expert Systems Applications (DEXA'00); Sep. 6, 2000; Greenwich, London, U.K.
Lam et al.; Querying Web Data—The WebQA Approach; The Third International Conference on Web Information Systems Engineering (WISE'00); Dec. 12, 2002; Singapore.
Witten et al.; Text Mining: A New Frontier for Lossless Compression; p. 198 Text Mining; Data Compression Conference (DCC'99); Mar. 29, 1999; Snowbird, Utah.
Calado; The Web-DL Environment for Building Digital Libraries From the Web; p. 346; 2003 Joint Conference on Digital Libraries (JCDL'03); May 27, 2003; Houston, Texas.
Czejdo; Automatic Generation Ontology Based Anntations in XML and Their Use in Retrieval Systems, Web Information Systems Engineering, 2000, Proceedings of the First International Conference, Jun. 19, 2000, p. 296.
Roberts; Top Priority on Bottom Line: More Companies Seeting to Manage Business Risks; .p. 3; Mar. 20, 2000; Business Insurance.
Chacko; Cephalon, Inc. Taking Risk Management Gherory Seriously; vol. 60; No. 2-3; Mar. 2001; Journal of Financial Economics.
Pila; In Case of Emergency; Contingent Capital; No. 5, vol. 102; p. 59; ISSN: 1527-5914; Sep. 1, 2001.
KUS; Contingent Capital: Just in the Capital Management Sets a New Standard; Sponsored Statement; p. 30, ISSN: 0958-2053; Oct. 1, 2002.
Rising to the Challenge of Global STP, Euromoney Publications PLC Global Inventor, Nov. 1, 1999, pp. 51-52; ISSN. 0951-3604.
Fan et al.; The Internet and Future Financial Markets; Industry Trend or Event, Association for Computing Machinery, Inc., Sec. 11, vol. 43; Nov. 1, 2000, p. 82; ISSN: 0001-0782.
STP in the Bond Market?, Wall Street & Technology, Dec. 1, 2002, p. 20.
Tradeweb's STP Vision, Euromoney Institutional Investor PLC, SEC. 406, vol. 34, Feb. 1, 2003, p. S6; ISSN: 0014-2433.
Block Trades Market Practice, Apr. 1, 2003, pp. 1-10.
Martin; Email Report, Issue 11, Aug. 16, 2001 Printed Aug. 2, 2005.
Emery, et al.; The Measurement of Liquidity, Journal of Accounting Research, vol. 20, No. 2, Part 1, p. 290-303, Autumn 1982.
Form 10-K, United States Securities and Exchange Commission, No Date, Year Ending Dec. 31, 2003.
CFTC (Commodity Futures Trading Commission) Glossary, http://www.cftc.gov/educationcenter/glossary/glossary_co.html#creditevent (last visited Nov. 18, 2008).
FIXPROTOCOL, Financial Information Exchange (Oct. 7, 1998).
Ron White, How Computers Work, 36-37, 266-267, 271 (4th ed. Sep. 1998).

* cited by examiner

DIVERSIFIED FIXED INCOME PRODUCT AND METHOD FOR CREATING AND MARKETING SAME

CROSS REFERENCE TO RELATED APPLICATIONS

This application claims the benefit of U.S. Provisional Application Ser. No. 60/470,179, filed by Jeffrey Davidovitch et al. on May 13, 2003 and entitled "Diversified Fixed Income Product and Method For Creating and Marketing Same", which is incorporated herein by reference.

FIELD OF THE INVENTION

This invention relates to fixed income financial products and, in particular, to a diversified fixed income product that provides periodic income payments at a substantially constant rate and a return of substantially par value at maturity, both with an enhanced level of security. The product is registered pursuant to the Securities Act of 1933, can be marketed to the public in relatively small denominations and can provide regular income over a long period of time.

BACKGROUND OF THE INVENTION

Income producing financial products are important components in the investment portfolios of millions of investors. Such products currently include single credit products such as certificates of deposit (CDs), bonds and preferred stocks. They also include multiple credit products like mutual funds and Unit Investment Trusts.

An ideal fixed income investment for many investors would provide secure periodic payments at a substantially constant rate of return over an extended period of time. The investment would be efficient to administer, tax efficient, and diversified. Advantageously, the investment would be founded on assets of quality known to the investors and would itself be an investment of quality known to the investors. Preferably the product would be available in small denominations accessible to the general public, would be liquid, and would resemble a bond. Unfortunately the currently available single credit and multiple credit fixed income products fall significantly short of this ideal.

Bonds are fixed income instruments that represent debt obligations of the issuer of the bond. They pay interest and return principal at a maturity date. Interest is generally paid semi-annually in cash, and the rate of interest usually reflects the credit risk of the issuer and the length of the term of the bond (maturity dates may extend as long as 100 years). In many cases, the credit risk of the issuer is denoted by the credit rating of the bond.

Bonds come in many forms and are issued by different parties. Among the more common forms are: (i) municipal bonds, typically exempt from certain taxes levied upon interest payments, (ii) government bonds, typically issued by a sovereign issuer like the United States, (iii) corporate bonds, typically issued by a corporation or limited partnership, and (iv) zero-coupon bonds, which usually pay interest in lump sum at a future date.

As noted, the credit risk associated with a bond is highlighted by its credit rating. A credit rating attempts to measure the likelihood that a bond continues to pay interest and returns principal at maturity. Bonds that have a lower probability of default are generally called "investment grade rated" (for example, the United States is AAA rated, reflecting the very low probability of default) and bonds that have a higher probability of default are "non-investment grade" or are considered "high yield" investments because the interest paid to investors must be greater to justify the increased risk of default. An investment grade bond is rated BBB−/Baa3 or above by S&P/Moody's. A non-investment grade is rated BB+/Ba1 or below.

Individual bonds, however, are not ideal fixed income investments. Government bonds are relatively risk free but tend to pay relatively low interest rates. Corporate bonds tend to pay higher interest rates but are subject to the risk of default by the issuer. Default risk can be reduced by diversification, but the investment required for adequate diversification may be beyond the means of many individual investors. Bonds typically have minimum denominations of $1000, and acquiring several can be expensive and affect the asset allocation of a modest portfolio. In addition, many corporate and some government and municipal bonds are subject to call provisions whereby the issuer has the right to redeem the bond prior to maturity. The investor receives the specified call price, but typically must reinvest at a less favorable interest rate.

Certificates of deposit ("CDs") or bank notes usually take the form of time deposits at financial institutions that offer an investor a fixed rate of return over the term of the CD or bank note. A common feature of these instruments is FDIC insurance that may cushion an investor from loss in the event of a default on payment of interest or return of principal by the financial institution.

CDs do not provide secure income over an extended period. They must be periodically rolled over at new prevailing interest rates. The rates available at rollover can vary dramatically. Moreover, CDs do not typically provide the periodic monthly or quarterly payments sought by many investors.

Preferred stock is an instrument typically issued by corporations or financial institutions that is subordinate to senior instruments such as bonds and CDs. Subordination refers to the priority of a preferred holder's claim against the issuer of the preferred stock should the issuer default on an interest payment or fail to return principal. A preferred stock holder's priority in bankruptcy falls behind the claim(s) of senior bond holder(s), and thus the credit risk associated with preferred stock is viewed as greater than the credit risk associated with bonds.

Some preferred instruments have maturity dates and others are perpetual. In addition, some preferred instruments have voting rights and features such as optional interest deferral clauses (allowing an issuer to stop paying interest for a period of time). Furthermore, some preferred securities (such as trust preferred) are considered debt instruments for tax purposes and others are considered equity instruments for tax purposes. In sum, the characteristics of preferred instruments vary widely, but one feature that typically exists in each instrument is risk due to subordination to senior instruments.

We now turn to the features and shortcomings of existing multiple credit fixed income products.

Mutual funds are popular products that exist pursuant to the provisions of the Investment Company Act of 1940 (the "1940 Act"). The premise of most mutual funds is asset diversification. Mutual funds were designed to enable investors to purchase investment units or shares in funds that hold a pool of assets. By purchasing an ownership interest in a fund, investors may be better sheltered from volatility and loss because their capital is invested across multiple institutions in debt, preferred and/or equity instruments. Mutual funds can be managed to track an index (like the S&P 500) or to pursue an investment strategy, such as a balanced return. A balanced fund might invest in both bonds and stocks in an attempt to mix the returns of bonds and stocks to better balance returns from the two asset classes. The income generated on investments (after management fees) and then distributed to fund holders is often variable and unpredictable. In addition, mutual fund shares are often not rated by a nationally recognized rating agency, though some of the assets that mutual funds invest in may be rated.

Mutual funds are exempt from registration under the Securities Act of 1933 (the 1933 Act) if they qualify as investment companies and comply with the rules and guidelines set forth in the 1940 Act. One predominant feature of mutual funds is the use of determinations of net asset value (NAV) to measure the value of the mutual fund shares. Usually at the end of each day, a mutual fund will calculate the net asset value of a mutual fund share. This calculation essentially prices the mutual fund shares by adding the fair market values of the assets held, deducting for costs, expenses or other liabilities, and then dividing by the number of outstanding mutual fund shares. If an investor would like to "sell" a mutual fund share, the investor contacts the mutual fund manager to redeem the mutual fund shares at a value approximating the net asset value. Therefore, mutual fund shares are usually purchased and sold through the redemption process, not traded on an exchange.

To summarize, the important highlights of typical mutual funds are: (i) creation pursuant to and in compliance with the 1940 Act (general exemption from the 1933 Act), (ii) net asset value as a measure of the price of a share, (iii) active management of the assets, and (iv) share redemption (as opposed to exchange-traded).

Mutual funds, as millions of investors are aware, do not provide either a secure stream of income or a secure return of investment. Income varies, NAV fluctuates, management fees can be significant, turnover can be tax inefficient, and the nature and quality of the fund investment portfolio can stray from initial objectives.

Unit Investment Trusts ("UITs") are also created pursuant to the 1940 Act. Like mutual funds, UITs are diversified investments that enable investors to purchase units that entitle them to fractional ownership of a pool of assets. Similarly, they are subject to the net asset value calculations typical of mutual funds and have sponsors that select the assets in the pool. Like mutual funds, UIT shares are often not rated, though some of the assets that UITs invest in may be rated.

However, unlike mutual funds, UITs tend to be passively managed. In other words, UIT sponsors are typically restricted in their ability to manage (or buy and sell) assets. This lack of management capability generally runs contrary to most mutual funds. As a result, UITs usually take the form of static pools of assets and the underlying securities in the pool do not change with frequency. However, as with mutual funds, the periodic rate paid to holders of UITs is typically not constant.

Accordingly, there is a substantial and unmet need for an improved fixed income product.

SUMMARY OF THE INVENTION

In accordance with the invention, a diversified fixed income product comprises a beneficial interest in an appropriately funded and constructed trust. The beneficial interests are created, registered and marketed to the public. They can also be rated and listed for exchange trading.

An early step in the process is selecting and acquiring a diversified set of assets including a plurality of income-producing assets such as coupon bonds. The diversified set of assets will reduce the risk of default but typically generate a flow of income that is irregular, e.g., during some months, several bond coupons may be received and, during other months, few or none may be received.

A trust is formed to hold the set of assets and to enter into financial arrangements to effectively smooth the cash flow received by the trust so that regular payments can be made to holders of beneficial interests in the trust. These arrangements can be smoothing loans for making up for any shortfall of cash required to pay holders in periods of low cash receipt. The loans can be repaid to the lender in periods of high cash receipt. Or the arrangements can be a swap of asset coupons for cash to pay periodic coupons to the holders.

The beneficial interests in the trust are created, registered and marketed to the public. The beneficial interests, which can be embodied in Trust Certificates, entitle owners to fractional ownership of the trust assets. The beneficial interests are registered for sale to the public under the 1933 Act and are marketed to the public, preferably in denominations of $1000 or less. They provide regular periodic payments to holders at a substantially constant rate on a preferably monthly or quarterly basis over a duration of many years.

Advantageously, a portion of the assets are selected and held to assure that interest holders receive par value at maturity of their interests. In a preferred approach, the assets include one or more zero coupon bonds of appropriate maturity date to assure par value. In an alternative approach a subset of income producing assets is dedicated to an account, termed a principal balance reduction account, to assist in providing par value at maturity. Additional advantageous steps include obtaining rating of the beneficial interests and listing them for exchange trading. The interests can be rated by, for example, Standard & Poors or Moody's. The interests can be listed on one or more domestic exchanges (e.g., the AMEX, the NYSE, or the NASDAQ) and/or one or more foreign exchanges.

A preferred embodiment named Select Notes™ provides a unique structure that offers investors a new design and method for fixed income investment. The structure is premised upon diversification and provides diversity through the pooling of assets in a grantor trust (the "Trust"). The Trust issues one series of trust certificates that entitle investors to direct ownership of the assets in the trust. The trust certificates are registered pursuant to the 1933 Act and listed on an exchange. The trust certificates are also rated by a nationally recognized rating agency and are designed to pay a constant fixed rate of interest and return principal at a maturity date(s). In this manner, Select Notes offers investors a way to purchase trust certificates that (i) are diversified, (ii) pay a constant fixed rate of interest, (iii) are SEC-registered, (iv) are exchange listed, and (v) are rated.

BRIEF DESCRIPTION OF THE DRAWINGS

The nature, advantages and various additional features of the invention will appear more fully upon consideration of the illustrative embodiments now to be described in detail in connection with the accompanying drawings. In the drawings.

These drawings are only for purposes of illustrating the general concepts of the invention.

DETAILED DESCRIPTION

Figure 1:
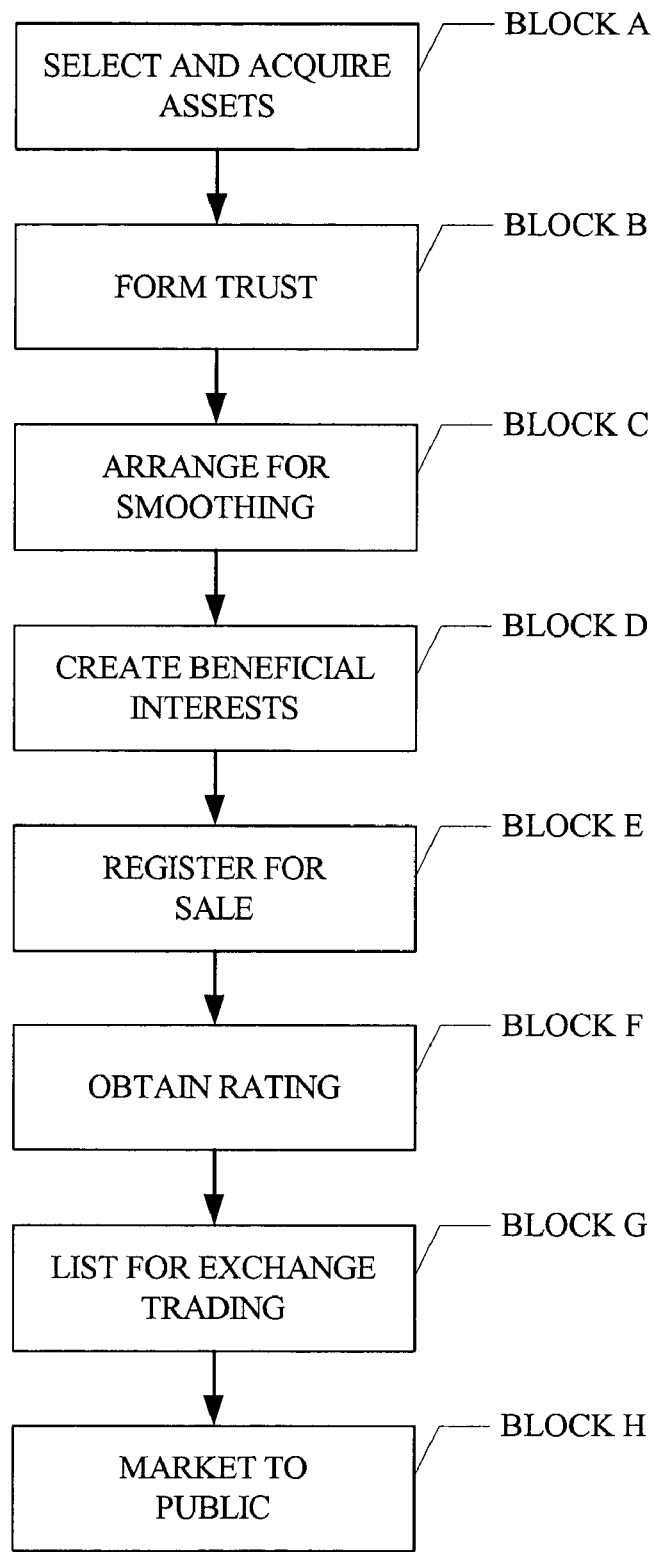
FIG. 1 is a schematic block diagram of the steps involved in creating, registering and marketing to the public a diversified fixed-income product in accordance with the invention.

Referring to the drawings, FIG. 1 illustrates steps in the process of creating, registering and marketing to the public a diversified fixed income financial product in accordance with the invention. The steps need not be performed in the sequence illustrated.

As shown in Block A of FIG. 1, a preliminary step is the selection and acquisition of a set or pool of assets including a plurality of income-producing assets. Typically, a pool of income-producing assets will collectively generate a flow of income that is irregular in the shorter time periods contemplated for periodic payments to holders of the fixed income product. For example, if the income-producing assets are coupon bonds, numerous semiannual coupon payments might fall within one month but few in another month, presenting an irregular flow of income. The assets are selected both to provide a desired level of return and also to provide substantially par value for the diversified fixed income product at a known maturity date. Thus the set of assets can include a subset of one or more zero coupon bonds to assist in returning par value at maturity. Alternatively the set of assets can include a subset of income producing assets dedicated to an account to assist in providing par value at maturity. An example of such an account, termed a principal balance reduction account, could be based on one or more Fannie Mae securities. The proceeds from the payment of principal at maturity and all interest distributions on the Fannie Mae securities would be deposited by the Trust into an interest bearing account for distribution to holders of the fixed income product at maturity.

The assets are advantageously rated securities to facilitate optional rating and exchange trading of the fixed income product. Typically the assets are bonds. Preferred selection criteria include yield, quality, maturity and diversification. Good yield is sought to enhance income to holders of the fixed income product. Quality is important for subsequent optional rating and exchange trading of the fixed income product. If a strong rating is desired, it is advantageous that all bonds should be investment grade or above. Maturity is important because it determines the life of the income product. Diversification reduces risk from default and recall. Advantageously the portfolio includes five or more and preferably ten or more coupon bonds chosen from different issuers in a variety of industrial sectors. The bonds can also be diversified as to maturity dates, and they can be laddered as to maturity dates.

More generally, the trust assets can be selected from among a wide variety of potential investments including, but not limited to: 1) corporate securities; 2) trust preferred securities; 3) asset-backed securities; 4) government securities, 5) government sponsored enterprise securities, and 6) foreign government securities. They can include municipal bonds, CDs and bank deposit notes. Arrangements can also be devised to use high yield bonds and/or derivatives.

A next step, shown in Block B, is forming a trust including the set of assets. The trust is constructed to hold the selected assets as an essentially static portfolio. This means that the assets are not typically traded but rather, in the absence of specified removal circumstances, are held to maturity of the income product. This reduces management fees and unexpected tax consequences. Removal circumstances include call by or bankruptcy of the bond issuer. In such event, the trust distributes any proceeds of the resulting redemption or liquidation to the holders and continues smoothed payments to the holders based on reduced income from the remaining portfolio. The reduced future payments are smoothed out over the remaining term of the trust.

As noted above, the plurality of income-producing assets collectively generates a flow of income that is irregular in the short time periods for fixed income payment. In some periods there would be a shortfall of cash to make regular payments and in some periods there would be an excess of cash. A third step (Block C) is entering into financial arrangements to effectively smooth the cash flow so that regular payments can be made to holders of the income product. Arrangements can be made for smoothing loans to make up cash shortfalls in periods of low cash receipt, the loans to be repaid in periods of high cash receipt. Advantageously, these smoothing loans are for fixed fee or at a fixed rate to insulate holders of the product from risk due to changes in interest rates. Alternatively, the trust can hedge against adverse interest rate changes. The cash flow can alternatively be effectively smoothed by a swap of the asset coupons for regular periodic coupons (e.g. monthly) to pay holders of the product.

The next step (Block D), is creating, as the diversified fixed income product, beneficial shares in the trust entitling owners to fractional ownership of the assets and providing periodic payments of income at a substantially constant rate. By various swaps, the payments can be of a fixed amount, at a fixed interest rate or at a floating interest rate. By currency swaps, the payments can be designated in U.S. dollars and paid in foreign currency, or they can be designated in foreign currency and paid in U.S. dollars. The period for payment is advantageously quarterly or monthly. The beneficial interests can be issued in the form of Trust Certificates.

Figure 2:
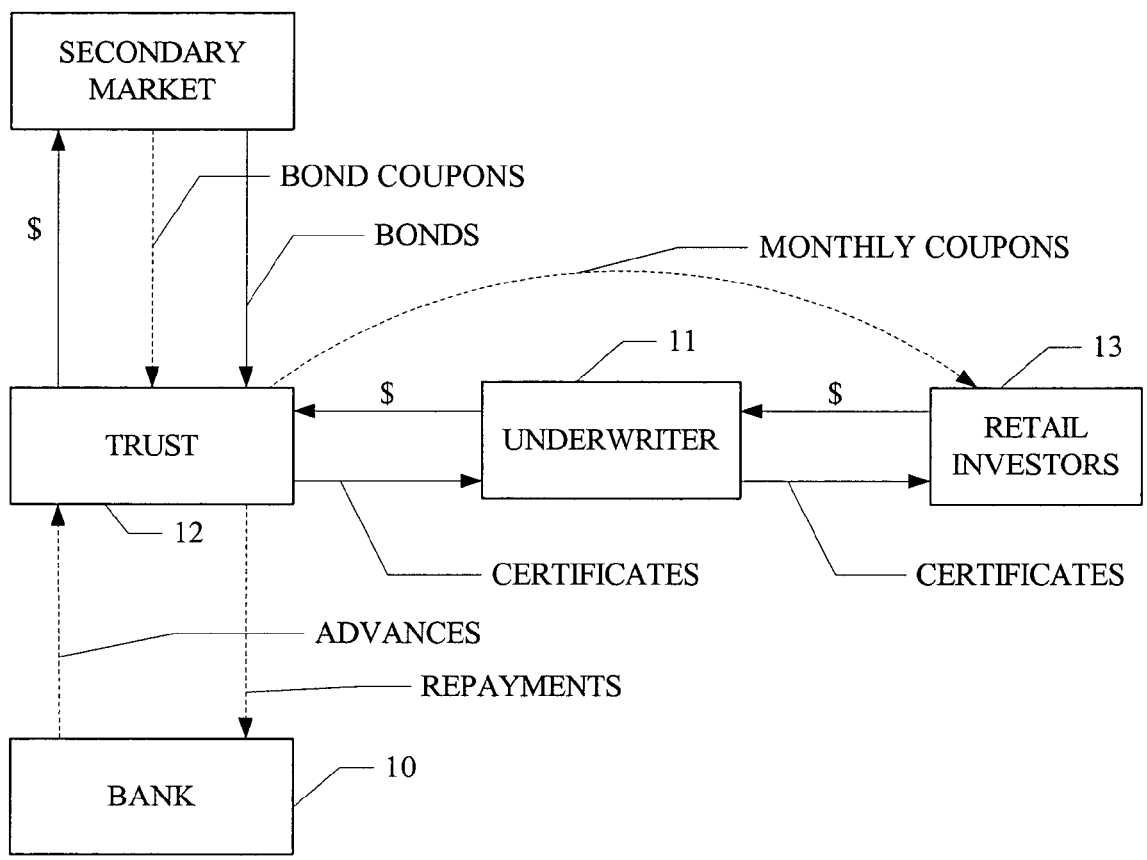
FIG. 2 is a block diagram illustrating the financial transactions typically involved in implementing steps A through D of FIG. 1.

FIG. 2 schematically illustrates typical financial transactions involved in creating the beneficial interests. It is contemplated that a Bank 10, one or more Underwriter(s) 11 and a Trust (represented by a trustee) 12 will cooperate to create the interests.

The Bank 10 and the Underwriter(s) 11 advantageously jointly identify the underlying assets based on the desires of customers, the credit and prospects of the issuers, and the selection criteria described hereinabove. The Trust 12 is formed by the trustee and enters into an underwriting agreement with the Underwriter(s) for the beneficial interests in the Trust (Trust Certificates).

At the closing: 1) the Underwriter(s) purchase the Trust Certificates from the Trust for distribution to retail investors; 2) the trustee delivers the assets to the Trust; and 3) the Bank enters into an advancing agreement with the Trust, agreeing to make smoothing loans to the Trust in exchange for payment of loans and fees from asset coupons.

Thus, the Trust receives the underlying assets in return for cash, and the Underwriter(s) receive the Trust Certificates from the Trust in return for cash. The Underwriter(s), in turn, are to receive cash from Retail Investors 13 who purchase the Trust Certificates. The Bank provides smoothing payments to the Trust and is repaid from the asset coupons. Finally, the Retail Investors 13 are to receive fixed periodic coupon payments from the Trust.

As shown in Block E, the beneficial interests are registered for sale to the public pursuant to the 1933 Act. An exemplary Prospectus Supplement of a shelf registration statement is attached hereto as Appendix A.

Optional further steps include obtaining rating of the beneficial interests, as by Standard & Poors or Moody's (Block F) and listing the interests for exchange trading, as on the AMEX, NYSE, NASDAQ and/or other domestic exchange (Block G). The interests could also be listed for trading on one or more foreign exchanges.

In Block H, the beneficial interests are marketed to the public. Advantageously they can be marketed through the Underwriter(s) in small denominations, e.g. denominations as small as $1000 or less, for ease of purchase.

An additional useful feature (not shown in FIG. 1) is to provide the beneficial interests with a feature whereby representatives of a deceased investor could require the issuer of the beneficial interests to buy back the interests of the deceased investor at par or at some other determinable value. Such a provision in the beneficial interests would in many instances simplify estate planning. Such a provision, referred to as an "estate put", would be exercisable by representatives of a deceased holder. It is not presently contemplated that it would apply to subsequent holders of interests that had been traded, although it is possible that similar provisions could be provided.

The resulting diversified fixed income product comprises a beneficial interest in a trust that periodically pays income at a substantially constant rate over a duration in excess of 5 years and preferably 10-30 years or more. The trust is comprised essentially of a set of assets including a plurality of income-producing assets, preferably coupon bonds. Although the assets provide irregular (but predictable) income over the periods for paying the interest holders, smoothing arrangements permit paying the holders periodically at a constant rate. A subset of the assets, such as a zero coupon bond, can assist in assuring par value at maturity. The beneficial interests can be issued in sufficiently small denominations for ease of purchase. Registration permits sale to the public. Optional rating facilitates consumer evaluation, and optional listing for exchange trading enhances liquidity.

The diversified fixed income product has numerous advantages for investors, such as retirees, in need of an investment that provides a steady stream of income at a predictable constant rate. The product can be obtained in small denominations ($1000 or less), provides the diversity of several different income-producing assets, and can provide a substantially constant level of payment for a duration sufficiently long to cover most retirements. It further provides par value (reduced by any intervening redemptions) at maturity. The portfolio can be static to reduce administrative costs and unexpected tax consequences. In addition, purchasers know at the outset the nature of the portfolio they are buying and that the composition of the portfolio will not significantly change.

The invention can now be more clearly understood by consideration of the following specific examples.

EXAMPLE

In a specific embodiment, the beneficial interests will be created and marketed under the name Select Notes (Appendix A). Select Notes is a new fixed income product that uses an effective shelf registration to issue SEC-registered trust certificates that represent direct ownership interests in a pool of assets. The assets in each trust are fixed income instruments that are (i) current pay (i.e. coupons are periodically paid over the life of the instrument), (ii) zero coupon bonds and/or (iii) preferred securities. The income from the assets held by the trust is derived from coupons received throughout the life of each Select Notes trust. The coupon payments made to certificate holders are smoothed pursuant to an advance agreement enabling the payment of a constant fixed rate of interest on the trust certificates. Under this agreement, a bank lends cash to the trust to enable it to pay consistent coupon payments to the holders. If the advancing mechanic were not in place, the trust would pay interest to the holders as interest from the underlying pool of securities was paid to the trust, resulting in uneven payments. As a result, the certificates are enhanced by the advancing mechanic because this mechanic provides investors with a stable, constant fixed rate of interest.

The trust certificates are rated by a nationally recognized rating agency as to the credit strength of the underlying pool of assets and likelihood of loss. This rating provides investors with a direct measure of the creditworthiness of the assets in the pool and enables investors to compare the risk of making an investment in the pool to the risk of other rated securities, such as bonds. Because the trust certificates are registered under the 1933 Act, the certificates are eligible for listing on an exchange, such as AMEX. As a result, an investor trades the certificates through a specialist on an exchange and is not subject to share redemption mechanics (i.e. NAV). Simply stated, there is a "live" price for the certificates and that price is quoted on an exchange, which makes selling the certificates similar to selling equity securities for the investor.

The structure is also designed to be efficient for investors. For example, there are no ongoing management fees or penalties for small purchases. The trust certificates are designed to resemble bonds, as the certificates have $1,000 denominations and are marketed using the same disclosure rules found in standard bond offerings (i.e. a prospectus is used as the offering document). Like bonds, after a purchase order, an investor receives a final prospectus and a confirmation order.

The Select Notes structure can be summarized as an exchange-listed, credit rated, trust-based and, most importantly, SEC-registered fixed income product that gives investors an efficient alternative to other investments. It is believed to be the first product to combine these characteristics and represents a new and advantageous way for investors to purchase fixed income products.

An exemplary Select Notes product is based on a pool of ten publicly issued investment grade rated long term corporate debt securities to provide income and U.S. Treasury strips to assist in maintaining par value at maturity. This product and its creation is described in detail in the Prospectus Supplement dated Mar. 24, 2003 attached hereto as Appendix A.

Figure 3:
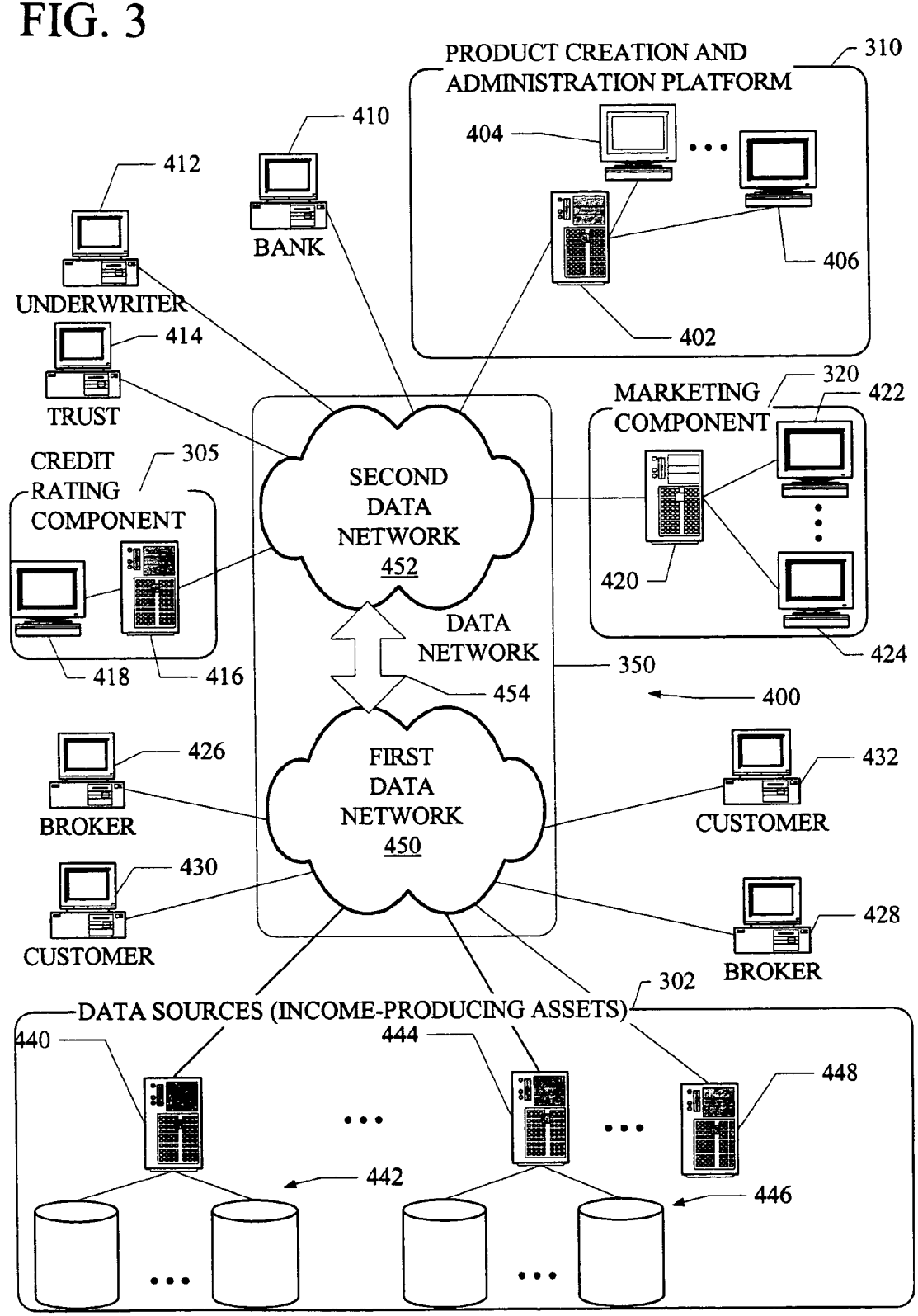
FIG. 3 schematically illustrates an automated system useful in implementing the method of FIG. 1.

It is contemplated that the process of creating, registering, marketing and administering the inventive diversified fixed income financial products can be automated though the appropriate use of data processors, data bases and data communication systems. FIG. 3 schematically illustrates a system useful in implementing these processes. The system is centered around a Product Creation and Administration Platform 310 operatively connected to a Credit Rating Component 305, a Marketing Component 320 and a plurality of Data Sources 302.

Product Creation and Administration Platform 310 comprises, according to this exemplary embodiment, a server 402 operatively connected to one or more work stations, represented by work station 404 and work station 406. While Product Creation and Administration Platform 310 is described in terms of server 402 and work stations 404 and 406, one skilled in the art will appreciate that networked servers, a main frame computer, networked PC's or any combination thereof.

Product Creation and Administration Platform 310 communicates with a bank, represented by PC 410, one or more underwriters, represented by PC 412 and a trust, represented by PC 414. While bank 410, underwriters 412 and trust 414 are each represented by a PC, one skilled in the art will realize that each one may be a network of PC's, a server, or a mainframe. Furthermore, one skilled in the art will appreciate that one or more of bank 410, underwriters 412 and trust 414 may be incorporated within Product Creation and Administration Platform 310, Credit Rating Component 305, Marketing Component 320, or a combination thereof.

As described in detail above, the present invention creates, rates and markets a diversified fixed income financial product. In general, in creating the financial product, the Product Creation and Administration Platform 310 implements the steps described with respect to Blocks A-D of FIG. 1. Typically, the Product Creation and Administration Platform 310 coordinates with a bank, one or more underwriters and a trust to create the beneficial interests. As described with respect to FIG. 2, the bank and underwriters can define selection criteria to identify assets based on the desires of customers and the credit and prospects of issuers, and assets meeting these criteria can be identified by Platform 210 from Data Sources 302.

The Product Creation and Administration Platform 310 can also support the management of the trust and administer the financial product. For example, the Product Creation and Administration Platform 310 can locate prospective banks to provide smoothing loans in accordance with the terms of an advancing agreement. The Product Creation and Administration Platform 310 can also make appropriate interest payments to customers and provide periodic customer statements. Accounting and compliance functions may also be integrated into the Product Creation and Administration Platform 310. Furthermore, the Product Creation and Administration Platform 310 also can interface with the Credit Rating Component 305 to seek financial rating of the product by an appropriate credit rating agency.

Credit Rating Component 305 is illustrated herein as a server 416 connected to a workstation 418. Again, one skilled in the art will understand that a network of servers, a mainframe, or a network of PC's may be substituted for server 416 and workstation 418.

Marketing Component 320 is represented herein as a server 420 connected to a plurality of workstations, represented by workstation 422 and workstation 424. One skilled in the art will appreciate that any processing system (samples of which are listed above) may be substituted for server 420 and workstations 422 and 424. Marketing Component 320 communicates with one or more securities brokers represented by broker PC 426 and broker PC 428. Brokers 426 and 428 may communicate electronically with customers, which are represented by customer PC 430 and customer PC 432.

The Marketing Component 320 can assist marketing the created financial product. By way of example, the Product Creation and Administration Component 310 can include a link with a plurality of securities brokers situated at remote locations. Information regarding available product and market prices may be electronically transmitted to the brokers. In addition, a prospectus and various marketing material may be generated (either electronically or in paper format) for the brokers or sent directly to prospective customers.

Data Sources 302 comprises a plurality of databases, represented by database server 440 and database server 444. Each of database server 440 and server 444 is connected to a plurality of data storage devices, 442 and 446, respectively. Further, Data Sources 302 may include a plurality of servers, represented by server 448, which receives real-time data from, for example, various bond markets.

Each of the Data Sources 302 can contain information about a particular type of financial instrument. For example, the Data Sources 302 may contain information associated with particular corporate securities, trust preferred securities, asset-backed securities, government securities, government sponsored enterprise securities, and foreign securities. In general, the Data Sources 302 can contain information associated with any type of income-producing asset useful in the trust.

Data Network 350 is represented herein as a first data network 450 and a second data network 452. First data network 450 comprises, in this exemplary embodiment, the Internet, as is known in the art. Second data network 452 comprises a private data network for secured transactions, which is also known in the art. First data network 450 and second data network 452 are connected by a secured connection 454, which may be a firewall in this exemplary embodiment.

The information from the Data Sources 302 can be transmitted to the Product Creation and Administration Component 310 via any suitable Network 350. The Network 350 can include any combination of wide area networks, local area networks, public switched telephone networks, wireless or wired networks, intranets, the Internet or any other distributed processing network or system.

It is understood that the above-described embodiments are illustrative of only a few of the many possible specific embodiments, which can represent applications of the invention. Numerous and varied other arrangements can be made by those skilled in the art without departing from the spirit and scope of the invention.

What is claimed is:

1. A computer implemented method of creating, registering and marketing to the public, fixed income beneficial interests entitling the owners to fractional ownership of a pool of assets that pay income, the method comprising:
   utilizing a computer implemented platform for selecting and acquiring from the secondary market the pool of assets including a plurality of income-producing assets that generate a flow of income;
   forming a trust which holds the pool of assets;
   utilizing a computer implemented platform for creating the beneficial interests in the trust, the beneficial interests having a par value and a maturity date;
   utilizing a computer implemented marketing component module to obtain financial arrangements for smoothing the flow of income to the interest holders from the assets to substantially match periodic payments to the interest holders at a substantially constant rate of interest at substantially constant intervals of time over the remaining term of the trust, the financial arrangement including obtaining smoothing loans to be repaid from the asset income, the smoothing loans being obtained from a bank which has entered into an advanced agreement with the trust to make smoothing loans to the trust to make up for cash shortfalls in periods of low cash receipt in exchange for payment of loans and fees from asset coupons during periods of high cash receipt;
   registering the beneficial interests for sale to the public with the Securities and Exchange Commission; and
   utilizing the computer implemented marketing component for marketing the beneficial interests to the public.

2. The method of claim 1 further comprising the step of obtaining one or more credit ratings on the beneficial interests.

3. The method of claim 1 wherein the beneficial interests of the trust have a par value and a maturity date and the assets are selected to provide substantially par value For the beneficial interests at the maturity date.

4. The method of claim 1 wherein the assets are selected to include one or more zero coupon bonds to provide substantially par value for the beneficial interests at the maturity date.

5. The method of claim 1 wherein the beneficial interests in the trust have a par value and the assets are selected to include a subset of income producing assets having income and principal value allocated to an account for providing par value for the beneficial interests at the maturity date.

6. The method of claim 1 wherein the assets consist essentially of bonds having a maturity date substantially the same as the maturity date of the beneficial interests.

7. The method of claim 1 wherein the loans are obtained for a substantially fixed fee or at a substantially fixed interest rate.

8. The method of claim 1 wherein the arrangements for smoothing the flow of income to the interest holders further comprise swapping the asset income for cash to pay periodic payments to the interest holders at a substantially constant rate of interest at substantially constant intervals of time over the remaining term of the trust.

9. The method of claim 1 including the step of listing the beneficial interests for exchange trading.

10. The method of claim 1 including the steps of obtaining one or more credit rations of the beneficial interests.

11. The method of claim 1 including the step of listing the beneficial interests for trading on the American Stock Exchange (AMEX), the New York Stock Exchange (NYSE), the NASDAQ, or any other exchange.

12. The method of claim 1 including the step of listing the beneficial interests for trading on one or more foreign exchanges.

13. The method of claim 1 wherein the assets consist essentially of bonds having substantially different maturity dates.

14. The method of claim 1 wherein the income producing assets comprise bonds laddered to different terms of maturity.

15. The method of claim 1 wherein the income producing assets comprise bonds diversified as to industry sector.

16. The method of claim 1 wherein the income producing assets comprise bonds diversified in maturity.

17. The method of claim 1 wherein the income payments are at substantially fixed amounts per period.

18. The method of claim 1 wherein the beneficial interests make payments in currency other than U.S. dollars.

19. The method of claim 18 wherein a swap or loan changes the currency of the payments from U.S. dollars to currency other than U.S. dollars.

20. The method of claim 18 wherein the income producing assets comprise one or more assets selected from the group consisting of corporate securities, trust preferred securities, asset-backed securities, government securities, government sponsored enterprise securities and foreign government securities.

21. The method of claim 1 wherein the income producing assets comprise one or more assets selected from the group consisting of municipal bonds, CDs, bank deposit notes, high yield bonds and derivatives.

22. The method of claim 1 wherein the income producing assets comprise one or more high yield bonds.

23. The method of claim 1 wherein the income producing assets comprise one or more investment grade bonds.

24. The method of claim 1 wherein the income producing assets comprise a plurality of bonds of a snide specific credit rating.

25. The method of claim 1 including the step of holding the assets in the trust as a static portfolio.

26. The method of claim 1 wherein income payments are paid quarterly or monthly.

27. The method of claim 1 wherein the term of the beneficial interests to maturity is in excess of about 5 years.

28. The method of claim 1 wherein the term of the beneficial interests to maturity is in the range of about 10-35 years.

29. The method of claim 1 wherein the beneficial interests are marketed in denominations of $1000 or less.

30. The method of claim 1 wherein the representatives of a deceased holder are provided with an option to sell back to the issuer the beneficial interests of the deceased holder.

31. A computer system for creating, registering and marketing to the public, fixed income beneficial interests entitling the owners to fractional ownership of a pool of as sets that pay income, comprising:
 a computer implemented platform configured to;
  select and acquire from the secondary market the pool of assets including a plurality of income-producing assets that generate a flow of income;
  form a trust which holds the pool of assets;
  create the beneficial interests in the trust, the beneficial interests having a par value and a maturity date;
  obtain financial arrangements for smoothing the flow of income to the interest holders from the assets to substantially match periodic payments to the interest holders at a substantially constant rate of interest at substantially constant intervals of time over the remaining term of the trust, the financial arrangement including obtaining smoothing loans to be repaid from the asset income, the smoothing loans being obtained from a bank which has entered into an advanced agreement with the trust to make smoothing loans to the trust to make up for cash shortfalls in periods of low cash receipt in exchange for payment of loans and fees from asset coupons during periods of high cash receipt;
  register the beneficial interests for sale to the public with the Securities and Exchange Commission; and
 a computer implemented marketing component configured to:
 a marketing computer component configured to;
  marketing the beneficial interests to the public.

* * * * *

UNITED STATES PATENT AND TRADEMARK OFFICE
CERTIFICATE OF CORRECTION

PATENT NO. : 7,634,435 B2  Page 1 of 1
APPLICATION NO. : 10/638019
DATED : December 15, 2009
INVENTOR(S) : Davidovitch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1435 days.

Signed and Sealed this

Ninth Day of November, 2010

David J. Kappos
*Director of the United States Patent and Trademark Office*